United States Patent
Schlecht

(10) Patent No.: US 6,966,591 B2
(45) Date of Patent: Nov. 22, 2005

(54) PROTECTION DEVICE FOR A MOTOR VEHICLE LUGGAGE AREA

(75) Inventor: Werner P. Schlecht, Vaihingen/Enz (DE)

(73) Assignee: BOS GmbH & Co. KG., Ostfildern (DE)

( * ) Notice: Subject to any disclaimer, the term of this patent is extended or adjusted under 35 U.S.C. 154(b) by 0 days.

(21) Appl. No.: 10/849,641

(22) Filed: May 19, 2004

(65) Prior Publication Data

US 2004/0232720 A1 Nov. 25, 2004

(30) Foreign Application Priority Data

May 20, 2003 (DE) .................. 103 23 605

(51) Int. Cl.⁷ ............................................. B60R 11/00
(52) U.S. Cl. .................. 296/37.16; 296/98; 296/24.43; 160/370.22
(58) Field of Search .............................. 296/37.16, 98, 296/24.43; 160/370.22

(56) References Cited

U.S. PATENT DOCUMENTS

| 3,889,970 | A | | 6/1975 | Astheimer et al. | |
|---|---|---|---|---|---|
| 6,155,621 | A | * | 12/2000 | Nishida et al. | 296/24.4 |
| 6,349,986 | B1 | * | 2/2002 | Seel et al. | 296/37.16 |
| 6,390,526 | B1 | * | 5/2002 | Ament et al. | 296/37.16 |
| 6,402,217 | B1 | * | 6/2002 | Ament et al. | 296/37.16 |

FOREIGN PATENT DOCUMENTS

| CH | 324 584 | 11/1957 |
|---|---|---|
| DE | 1 957 525 | 3/1967 |
| DE | 199 09 142 | 5/2000 |
| DE | 100 31 294 | 1/2002 |
| GB | 1 554 528 | 10/1979 |

* cited by examiner

Primary Examiner—Joseph D. Pape
(74) Attorney, Agent, or Firm—Flynn, Thiel, Boutell & Tanis, P.C.

(57) ABSTRACT

A protection device is provided with at least one flat article, which can be alternatively transferred into a roughly vertical protection position or a roughly horizontal position. Means for varying the transmittance of the flat article are provided and are coupled to control means which, as a function of a displacement of the flat article between the protection positions, control the transmittance varying means.

20 Claims, 5 Drawing Sheets

PROTECTION DEVICE FOR A MOTOR VEHICLE LUGGAGE AREA

FIELD OF THE INVENTION

The invention relates to a protection device for a motor vehicle luggage or loading area or space having at least one flat article, which can be alternatively transferred into a roughly vertical protection position or a roughly horizontal protection position.

BACKGROUND OF THE INVENTION

Protection devices for combi-car luggage areas are generally known. Such a protection device has a magazine casing located in the vicinity of a rear seat back arrangement. The magazine casing has two flat articles, which are in each case mounted in draw in and out manner on an independent winding shaft. One flat article can be extracted roughly horizontally and serves as the luggage area cover. The other flat article is extractable roughly vertically and serves as a separating device between the luggage area and a combi-car passenger area. The flat article of the separating device is transparent, in that it is constructed as a separating net. The flat article functioning as the luggage area cover is view-proof and therefore substantially opaque, so that in the extracted protection position of the luggage area cover it is not possible to view the content of the luggage area from outside the vehicle.

The problem of the invention is to provide a protection device of the aforementioned type permitting with simple means variable protection functions.

SUMMARY OF THE INVENTION

This problem is solved in that means for varying the transmittance of the flat article are provided and are coupled to control means which, as a function of a displacement of the flat article between the protection positions control the transmittance varying means. The solution according to the invention makes it possible to use a single flat article both as a horizontal and vertical protection structure. Thus, it is possible to obtain a luggage area cover function in which the flat article forms a seeing or viewing protection for luggage or goods located below the roughly horizontally fixed luggage area cover. In the roughly vertically fixed protection position the transmittance of the flat article is increased, so that a separating device can be obtained between the luggage area and the passenger area, without there being excessive hindrance to the rearward viewing for the driver, especially through a rear-view mirror. According to the invention preferably the position and/or displacement movement of the flat article within the luggage area is detected. Using the control means necessarily the detected state is evaluated and associated with the corresponding transmittance requirement. Subsequently the transmittance varying means are appropriately controlled. Preferably the detection of the flat article position and the control, as well as the variation of the transmittance of the flat article take place mechanically. It is also possible to have an electrical and/or electronic, pneumatic, hydraulic or some other detection, coupling and control, as well as transmittance modification. A corresponding solution can also combine said operating modes. For detecting the position or displacement movement of the flat article it is possible to provide a mechanical forced guidance, which has a mechanical coupling and movement transmission with means for modifying the transmittance of the flat article. It is alternatively possible to provide sensor means with respect to the position change of the flat article, which are coupled to a control unit for controlling the flat article transmittance varying means.

According to a development of the invention, the flat article has two parallel flat structural portions displaceable in parallel to one another. The parallel displaceability of the two flat structural portions with respect to one another preferably takes place through the flat article transmittance varying means.

According to another development of the invention, the flat article has at least two flat structural portions connecting onto one another in the longitudinal direction of the flat article and which have different transmittance values. The overall length of the flat article constituted by the at least two interconnected flat structural portions is significantly greater than the in each case effective and functioning length in one of the two protection positions. Thus, as desired, the flat article can be positioned in such a way that in each case the desired flat structural portions with a defined transmittance is in the fixed protection function.

According to a further development of the invention, the flat article has a web-like flat structure, which loops at least one functional shaft over at least a limited circumferential portion. The flat structure can be deflected by means of a functional shaft in the form of a deflection shaft in such a way that there are two mutually parallel flat structural portions. It is alternatively possible to wind on and off the flat structure with respect to at least one functional shaft in the form of a winding shaft, so that the length of the in each case active flat structural portion and the portion to be used in each case can be selected in the case of portions with different transmittance.

In a further development of the invention there are at least two mutually parallel spaced functional shafts to which the flat article is connected. This in particular makes it possible to carry out a winding up and off of the flat article corresponding to the film spool principle when the functional shafts are designed as winding shafts. Thus, flat structural portions with differing transmittance can be transferred, as desired, into their functional state or their wound-up rest state.

According to a further development of the invention, the parallel flat structural portions are created by deflecting the web-like flat structure about a functional shaft serving as a deflection shaft. As a result of the preferably 180ø deflection, an extremely close parallel guidance of the flat structural portions can be obtained. For a close parallel guidance, additionally either the deflection shaft can itself have a small diameter or immediately adjacent to the deflection shaft means are provided for bringing together the flat structural portions, which preferably in the manner of a clip or clamp closely bring together said flat structural portions so that they are in contact or close without contact.

According to a further development of the invention, the flat structure is guided without friction around the deflection shaft. This is intended to prevent a slipping through of the flat structure on the deflection shaft. The frictionless deflection can be brought about by suitable material choice for the deflection shaft casing or by additional profilings, such as teeth or the like, the teeth engaging in corresponding hole patterns or rows of the flat article.

According to a further development of the invention, the flat structural portions have matched patterns of transparent and non-transparent areas and the flat structural portions are so displaceable parallel to one another that the flat article, as a function of the transfer state of the particular flat structural portions, has a modified transmittance. Thus, preferably, the flat article, as desired, acts in transparent, partly transparent or non-transparent manner. The patterns are particularly constituted by net, hole or strip patterns, which can be positioned so as to overlap or be displaced relative to one another and in this way the desired, differing transmittance is obtained. The flat structure can be constituted by a textile material such as a woven or knitted fabric material or a sheet web or also a flat article formed from different flat structural parts. Different flat structural parts can in particular be formed by lamellas. Preferably the control means control the flat article transmittance varying means in such a way that in a roughly horizontal protection position the flat article has a reduced transmittance and in the roughly vertical protection position an increased transmittance.

According to a further development of the invention, the at least two interconnected flat structural portions with different transmittance values form a common flat structural web, which with its facing end regions can be wound on or off two parallel functional shafts in the form of winding shafts. This creates a function based on the film spool principle. Preferably the two winding shafts are rotatable in synchronization by synchronizing means, which can be coupled to corresponding drive units for one or both winding shafts.

According to a further development of the invention, the flat article is formed by several lamellas, which are so held by guidance means that the lamellas can change their relative orientation. The lamellas form flat structural parts, which are preferably movable independently of one another or coupled together.

According to a further development of the invention, the guidance means are coupled to the control means in order to bring about a position-dependent lamella control. Preferably the lamellas for the roughly horizontal protection position are controlled in such a way that they engage with one another in substantially flat, flush manner, whereas in the roughly vertical protection position they are preferably tilted out parallel to one another, so that between in each case adjacent lamellas corresponding observation slits can be produced.

According to a further development of the invention, at least one functional shaft is forcibly guided at opposite front ends in a linear guidance arrangement between the roughly horizontal and the roughly vertical protection position, the linear guidance arrangement having associated with it the control means for controlling the flat article transmittance varying means. This is a mechanical forced control preferably designed in such a way that the approximate right angle between the roughly horizontal protection position and the roughly vertical protection position is utilized so that as a result of corresponding identically guided forced control it is possible to bring about a transmittance change from an increased to a greatly reduced level or vice versa.

According to a further development of the invention, compensating means acting on the flat article are provided and compensate the flat article length on passing from one protection position into the other in such a way that in both protection positions a tight orientation of the flat article is obtained. This leads to a length compensation, which is particularly advantageous if the flat article length is greater for the horizontal than for the vertical protection position. This is particularly the case with combi-cars or stretched limousines, where the luggage area in the vehicle longitudinal direction is longer than the height of an upper luggage area portion roughly between a vehicle edge and a roof lining of the luggage area.

BRIEF DESCRIPTION OF THE DRAWINGS

Further advantages and features of the invention can be gathered form the following description of preferred embodiments of the invention, the claims and the attached drawings, wherein show:

DETAILED DESCRIPTION OF THE INVENTION

Figure 1:
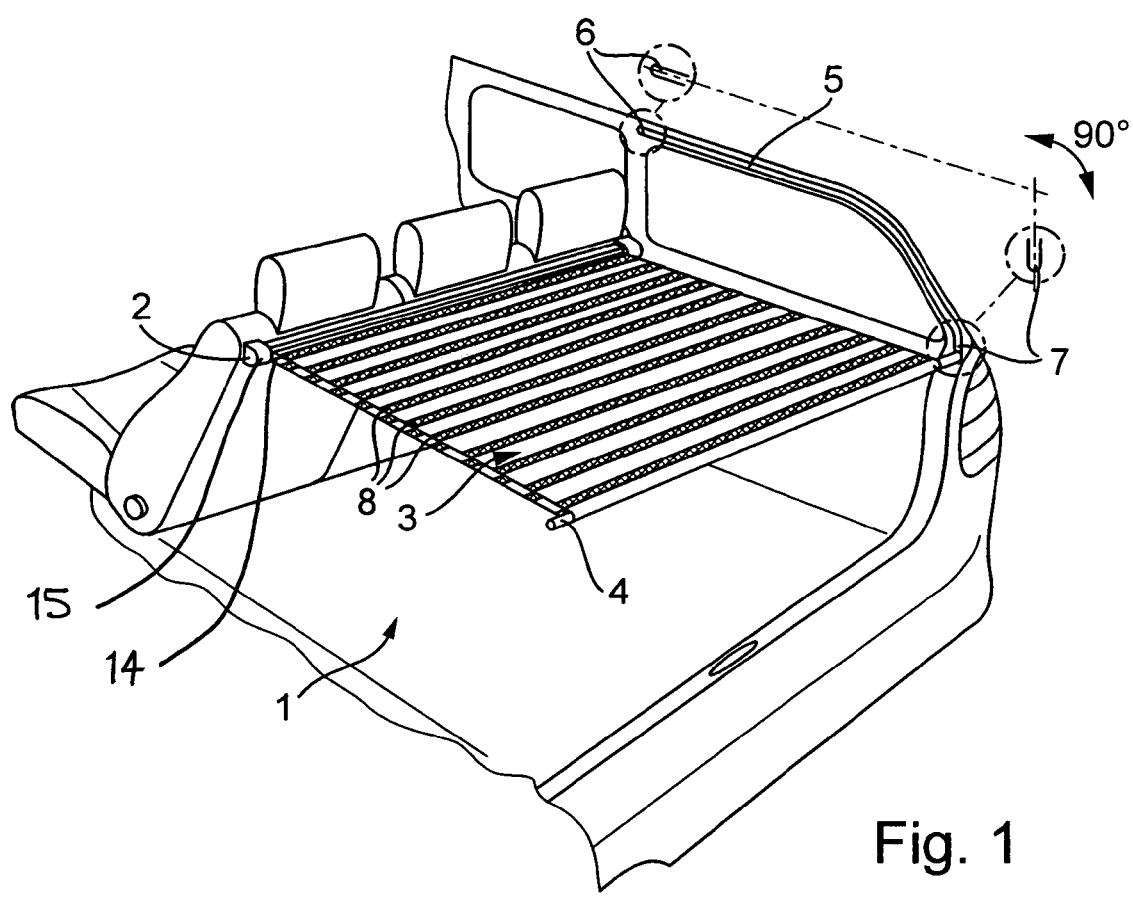
FIG. 1 Perspectively a luggage area for a motor vehicle, which is provided with an embodiment of a protection device according to the invention.

A loading or luggage area or space 1 for a car, in the present case a combi-car or some similar car with a large luggage area, has a not designated luggage area base or floor. In the state shown, the luggage area 1 is forwardly bounded by a rear seat back arrangement. Towards the sides the limitation is in each case provided by a vehicle side wall. Towards the rear the luggage area 1 is bounded by a tailgate. The luggage area 1 can be secured by a protection device. Here the protection device has a magazine casing 2, which is fixed on the vehicle side close to the seat back arrangement. A winding shaft 14 is mounted in rotary form in the magazine casing 2 and on it can be wound and from it can be unwound a flat article 3. The winding shaft 14 is energized in the winding up direction of the flat article 3 by a return arrangement, here in the form of a return spring 15. The flat article 3 is movably mounted between a first protection position, where the luggage area 1 is roughly horizontally covered (FIG. 1) and a second protection position in which the flat article 3 is fixed roughly vertically to a roof lining of the motor vehicle.

On its front end region in the extraction direction, the flat article 3 has a deflection shaft 4, which is held with its facing front ends in a linear guidance arrangement 5 formed by two guide rails on each vehicle side. The front ends of the deflection shaft 4 are in each case provided in hammer head-like manner with slide members, which are linearly displaceable and therefore slidable or rollable in guide grooves of the guide rails of the linear guidance arrangement 5. Thus, the front ends of the deflection shaft 4 are not rotatable within the guide grooves and are instead only linearly displaceable. Both for the roughly horizontal protection position and the roughly vertical protection position of the flat article, each guide groove has an end region 6, 7, shown on a larger scale in FIG. 1 to facilitate understanding. As is apparent from FIG. 1, the end regions 6, 7 of each guide groove 5 are oriented at right angles to one another.

Thus, during the course of the guide grooves between the two end regions 6, 7, the deflection shaft 4 also pivots by 90ø on transferring from one end region 7 into the other end region 6. The reason for the 90ø pivoting is described in greater detail hereinafter.

Figure 2:
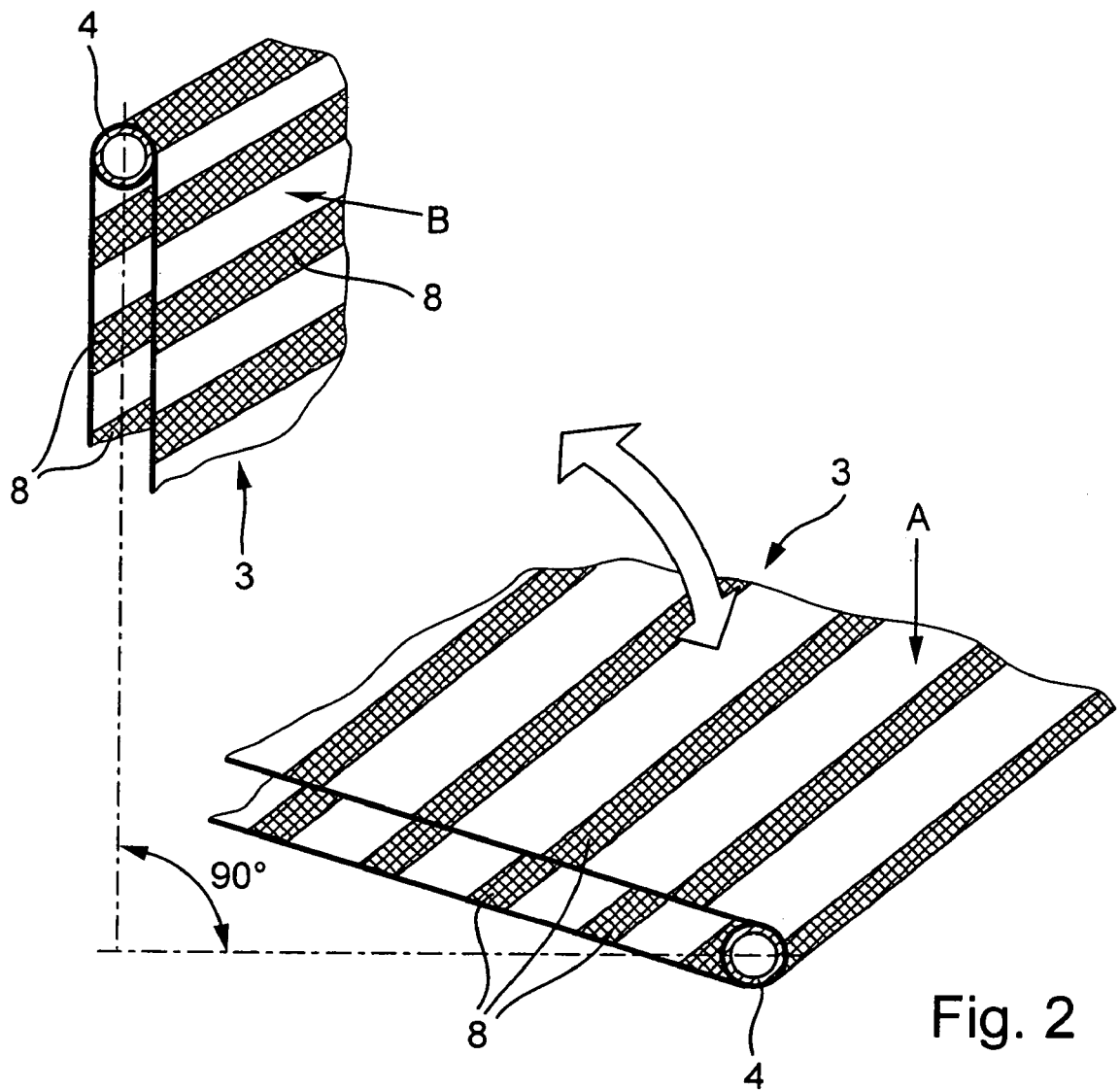
FIG. 2 A larger scale view of a detail of a flat article of the protection device in different protection positions.
Figure 3:
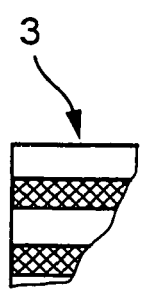
FIG. 3 A detail of a flat article according to FIG. 2 in the roughly vertical protection position in the direction of arrow B.
Figure 4:
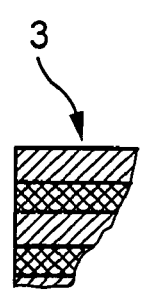
FIG. 4 A detail of the flat article according to FIG. 2 in a horizontal protection position in the direction of arrow A.

According to FIGS. 1 and 2 the flat article 3 is formed by a weblike flat structure in the form of a sheet web, which is provided in uniformly spaced manner with opaque strips, which extend over the entire width of the flat article 3. The sheet web is doubled, in that it loops the deflection shaft 4. This gives two parallel flat structural portions. In the vicinity of the winding shaft in the magazine casing 2 both flat structural portions can be jointly wound on and off the winding shaft. The deflection shaft 4 tensions the flat article 3. The sheet web is deflected in frictionless manner round the deflection shaft 4. During the displacement movement of the deflection shaft 4 between the vertical protection position in end region 6 of the guide rails and the horizontal protection position in end region 7 of the guide rails, the deflection shaft 4 rolls by a quarter revolution within the loop formed by the sheet web. The flat pattern of the strips 8 is chosen in such a way that the spacings between two adjacent strips correspond to the thickness of in each case one strip. The rolling movement of the deflection shaft 4 by a quarter revolution preferably also corresponds to a rolling path corresponding to the thickness of a strip 8. The two parallel flat structural portions of the sheet web, i.e. the flat article 3, are tensioned by the deflection shaft 4 and the return force of the return arrangement within the magazine casing in such a way that in the horizontal protection position the strips 8 of the upper and lower flat structural portion are in each case mutually displaced by one division. Thus, on viewing from above the flat article 3, the appearance is in accordance with FIG. 4. This means that in this position the flat article 3 is largely opaque and consequently not transparent. This creates the desired viewing protection when the flat article 3 is functioning as a horizontal luggage area cover. On transferring into the roughly vertical protection position, the deflection shaft 4 within the looping by the sheet web has performed a quarter revolution. As this quarter revolution corresponds to the division of the strips 8, the flat structural portions of the sheet web have necessarily been displaced in parallel to one another, so that the strips 8 of the front and rear flat structural portion are oriented in aligned manner to one another. Thus, in a plan view of the flat article 8 in the direction of arrow B according to FIG. 3, there are parallel observation slits, i.e. transparent strip areas. Thus, in the roughly vertical protection position it is possible to see through the flat article 3.

Figure 5:
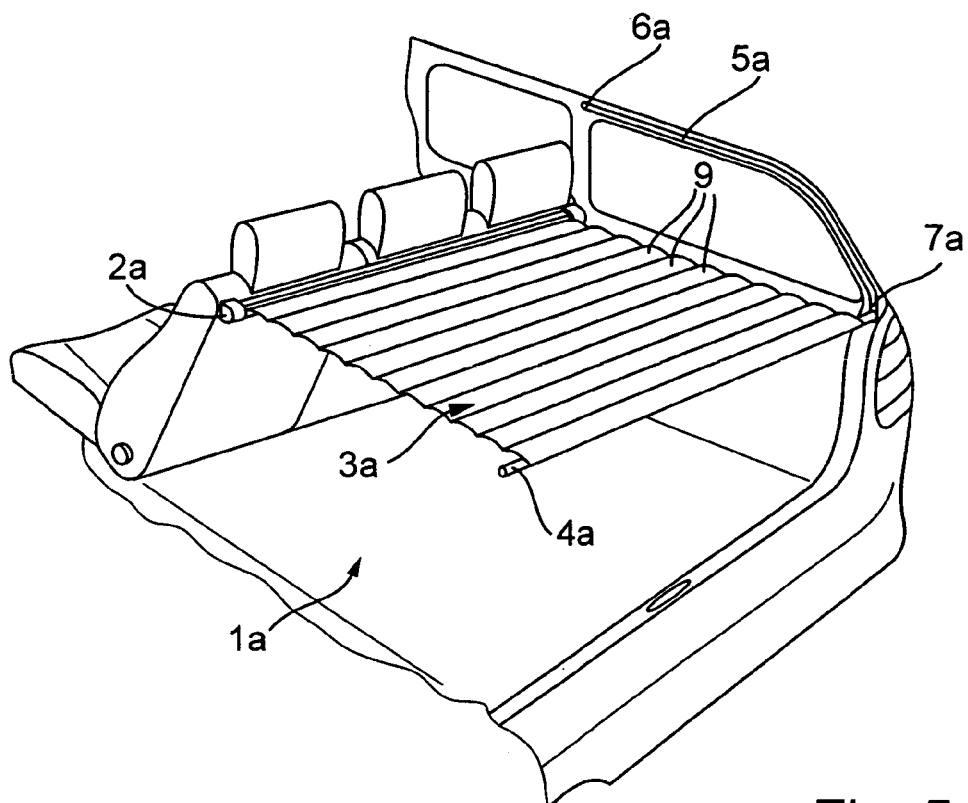
FIG. 5 A further embodiment of a protection device according to the invention within a motor vehicle luggage area, the flat article being in a horizontal protection position.
Figure 6:
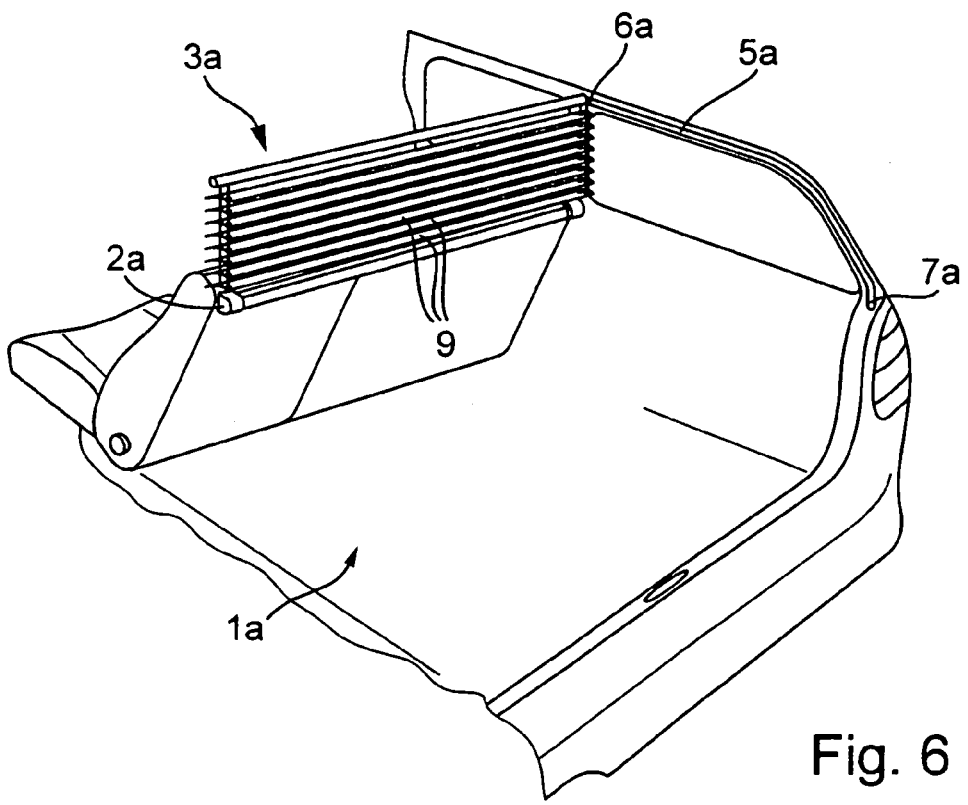
FIG. 6 The protection device of FIG. 5 with a flat article transferred into a roughly vertical protection position.
Figure 7:
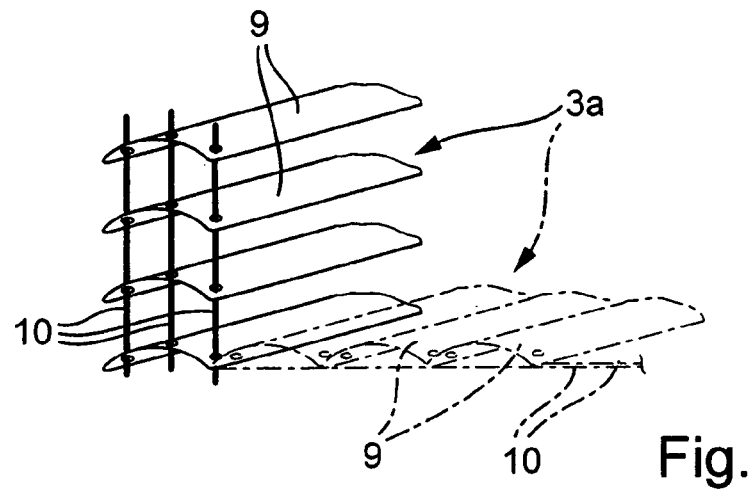
FIG. 7 A larger scale view of a detail of the flat article for the protection device according to FIGS. 5 and 6.

In the embodiment according to FIGS. 5 to 7 a protection device for a motor vehicle luggage area 1a is shown, which as regards construction and function largely corresponds to the embodiment described hereinbefore relative to FIGS. 1 to 4. Functionally identical parts are given the same reference numerals, but to which has been added the letter a. Thus, reference should additionally be made to the disclosure concerning the embodiment of FIGS. 1 to 4.

The essential difference in the embodiment according to FIGS. 5 to 7 is that the flat article 3a is formed by several mutually spaced flat structural parts in the form of lamellas 9. On its front end in the extraction direction the flat article 3a has an extraction ledge 4a, whose front ends are guided in the same way as the deflection shaft 4 of the embodiment according to FIGS. 1 to 4. The lamellas 9 are guided by tension means 10 and interconnected. The tension means 10, which are preferably in the form of cords or strings, particularly tear-proof plastic strings, are terminally connected to the extraction rod 4a. The lamellas are interconnected on each side by in each case one central tension means and two outer tension means. The tension means 10 are used for the displacement of the lamellas 9 relative to one another. In the roughly horizontal protection position the lamellas engage in flush, flat manner, so that they form a through, non-transparent surface. In the roughly vertical protection position they are oriented in superimposed, parallel manner, so that observation slits are formed between the individual lamellas 9. The lamellas 9 are constructed in common with the tension means 10 in such a way that they permit a reliable retention for luggage or goods in the luggage area in the case of a vehicle impact.

Figure 8:
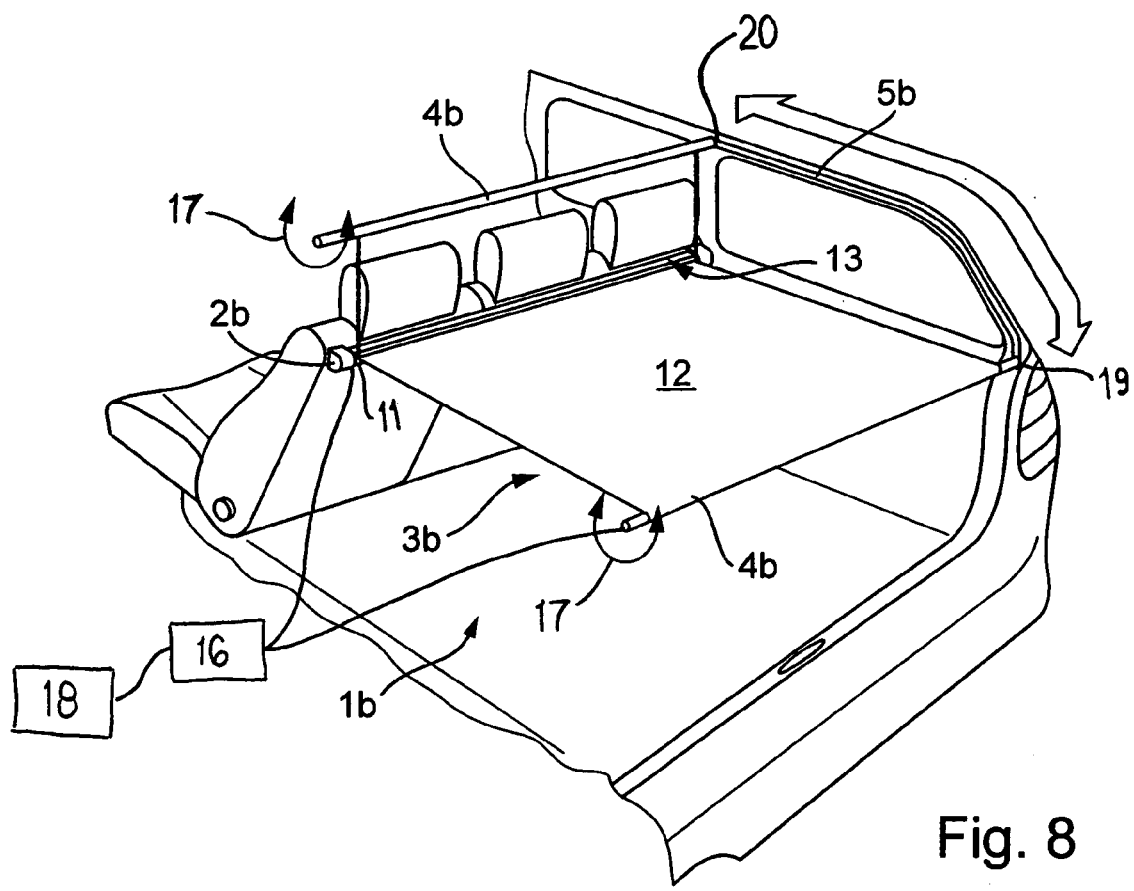
FIG. 8 Another embodiment of a protection device according to the invention for a motor vehicle luggage area.
Figure 9:
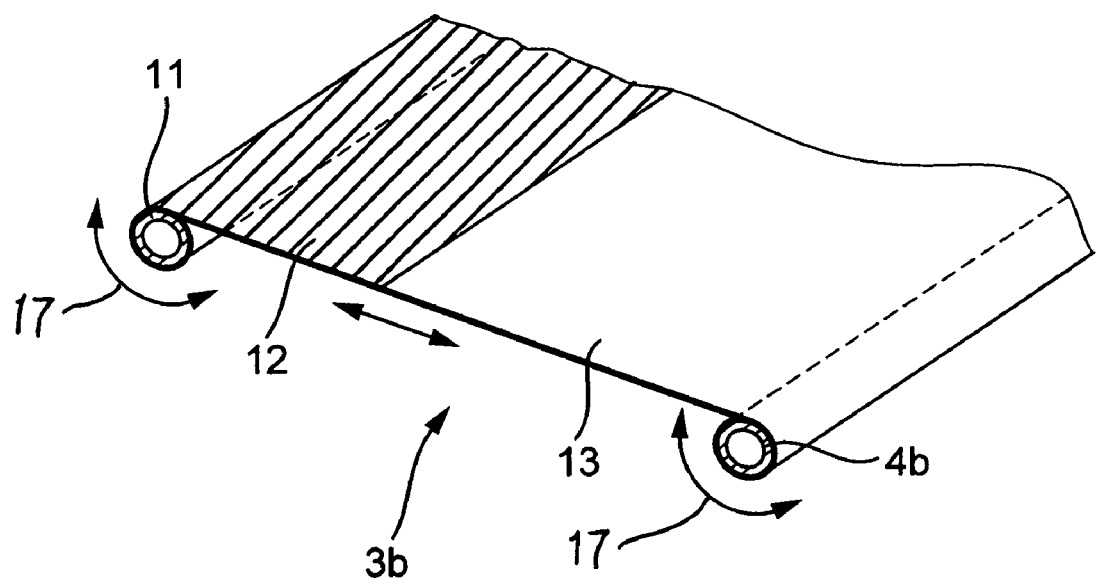
FIG. 9 The flat article of the protection device of FIG. 8 in a larger scale, perspective view.

FIG. 8 also shows a protection device having a flat article 3b, which in both a roughly horizontal protection position and a roughly vertical protection position can be fixed. On the front end region of the flat article 3b in the extraction direction is provided a winding shaft 4b, which can be displaced with its facing front ends in the guide rails 5b of the linear guidance arrangement. The winding shaft 4b is mounted in rotary manner despite its linear guidance. The flat article 3b is formed by a sheet web, which comprises two longitudinally engaged flat structural portions 12, 13. The flat structural portion 12 is not transparent. However, the flat structural portion 13 is transparent. The sheet web is held so that it can be wound on and off the winding shaft 4b and also the winding shaft 11, which is mounted in rotary manner in the magazine casing 2b. The two winding shafts 4b and 11 can be rotated synchronously with one another, in that with both winding shafts 4b, 11 is in each case associated a return arrangement 16, which applies return or retraction forces 17 in opposite directions. The flat article portion tensioned between the winding shafts 11, 4b is consequently always held taut. Depending on whether there is to be a non-transparent flat article portion for the function of the horizontal luggage area cover or a transparent flat article portion for the function of the vertical partition, the winding shafts 4b, 11 are correspondingly drivable in order to fix the transparent flat article portion 13 or the non-transparent flat article portion 12 and to wind up the in each case other flat structural portion 12, 13. Preferably the return arrangement 16 is an electrical drive mechanism associated with both winding shafts 4b, 11 and is preferably controlled by a control unit 18 in each case. For the end regions of the linear guidance arrangement 5b, which define the horizontal and vertical protection position, sensor means 19, 20 are provided. Sensor means 19, 20 detect the horizontal or vertical protection position assumed by the winding shaft 4b along the linear guidance arrangement 5b and transmit corresponding signals to the control unit. The control unit can then control the desired transparency or non-transparency of the flat article.

It is alternatively possible without electric drives, a control unit or sensor means to displace and manually wind up or off the winding shaft 4b along the linear guidance arrangement 5b in order to fix the desired flat article portion 12, 13.

What is claimed is:

1. Protection device for a motor vehicle luggage area having at least one flat article, which can be alternatively transferred into a roughly vertical protection position or a roughly horizontal protection position, wherein means are provided for modifying the transmittance of the flat article and which are coupled to control means controlling the transmittance modifying means as a function of a displacement of the flat article between the protection positions.

2. Protection device according to claim 1, wherein the flat article has two parallel flat structural portions, which are positioned so as to be displaceable in parallel to one another.

3. Protection device according to claim 1, wherein the flat article has at least two flat structural portions connected to one another in the longitudinal direction of the flat article and having different transmittance values.

4. Protection device according to claim 1, wherein the means for modifying transmittance comprises at least one functional shaft and the flat article has a weblike flat structure, which embraces the at least one functional shaft at least over a limited circumferential portion.

5. Protection device according to claim 4, wherein there are two mutually parallel spaced functional shafts with which the flat article is connected.

6. Protection device according to claim 2, wherein the means for modifying transmittance comprises at least one functional shaft and the parallel flat structural portions are created by deflecting the flat article about a functional shaft serving as a deflection shaft.

7. Protection device according to claim 6, wherein the flat article is looped in frictionless manner around the deflection shaft.

8. Protection device according to claim 3, wherein the flat structural portions have mutually matched patterns of transparent and non-transparent regions, and wherein the flat structural portions are displaceable parallel to one another in such a way that the flat article has a modified transmittance.

9. Protection device according to claim 3, wherein the at least two interconnected flat structural portions with different light transmittance values form a common flat structural web the structural web having facing end regions and being held so that it can be wound on or off parallel winding shafts.

10. Protection device according to claim 9, wherein the winding shafts can be rotated synchronously for winding on and winding off the structural web.

11. Protection device according to claim 1, wherein the control means are connected to a drive mechanism for at least one winding shaft in such a way that in a roughly horizontal protection position the flat article has a reduced transmittance and in the roughly vertical protection position an increased transmittance, the means for modifying transmittance comprising the drive mechanism and winding shaft.

12. Protection device according to claim 1, wherein the flat article is formed by several lamellas, the lamellas being held by tension means, and the tension means being configured to hold the lamellas in one of a plurality of protection positions.

13. Protection device according to claim 12, wherein the tension means are coupled to the control means in order to bring about a position-dependent lamella control.

14. Protection device according to claim 1, further comprising a functional shaft arranged for movement in a linear guidance arrangement between the roughly horizontal protection position and the roughly vertical protection position, the control means being associated with the linear guidance arrangement.

15. Protection device according to claim 1, wherein a return arrangement acts on the flat article to compensate the flat article length on passing from one to the other protection position in such a way that a tight orientation of the flat article is obtained in both protection positions.

16. Protection device for a motor vehicle luggage area having at least one flat article, which can be alternatively transferred into a roughly vertical protection position or a roughly horizontal protection position, wherein the transmittance of the flat article is configured for modification as a function of a displacement of the flat article between the protection positions.

17. Protection device according to claim 16, the flat article further comprising two parallel flat structural portions that are configured to be displaceable in parallel to one another.

18. Protection device according to claim 17, wherein the parallel flat structural portions are created by deflecting the web-like flat structure about a deflection shaft.

19. Protection device according to claim 17, wherein the flat structural portions have mutually matched patterns of transparent and non-transparent regions, and wherein the flat structural portions are displaceable parallel to one another in such a way that the flat article has a modified transmittance.

20. Protection device according to claim 16, the flat article further comprising at least two flat structural portions connected to one another in the longitudinal direction of the flat article and having different transmittance values.

* * * * *